(12) United States Patent
Layher

(10) Patent No.: US 7,567,904 B2
(45) Date of Patent: Jul. 28, 2009

(54) MOBILE LISTING SYSTEM

(76) Inventor: Kent Layher, 4433 Lochurst Dr., Pfafftown, NC (US) 27040

( * ) Notice: Subject to any disclaimer, the term of this patent is extended or adjusted under 35 U.S.C. 154(b) by 872 days.

(21) Appl. No.: 11/284,560

(22) Filed: Nov. 22, 2005

(65) Prior Publication Data

US 2007/0088555 A1    Apr. 19, 2007

Related U.S. Application Data

(60) Provisional application No. 60/727,356, filed on Oct. 17, 2005.

(51) Int. Cl.
  *G10L 11/00*  (2006.01)
  *G06F 3/16*   (2006.01)
(52) U.S. Cl. .................. 704/270; 704/275; 715/727
(58) Field of Classification Search ............... None
  See application file for complete search history.

(56) References Cited

U.S. PATENT DOCUMENTS

| | | | | |
|---|---|---|---|---|
| 6,038,199 | A * | 3/2000 | Pawlowski et al. | 369/29.02 |
| 6,069,940 | A * | 5/2000 | Carleton et al. | 379/88.04 |
| 6,370,238 | B1 * | 4/2002 | Sansone et al. | 379/88.23 |
| 6,907,397 | B2 | 6/2005 | Kryze | |
| 6,996,212 | B1 * | 2/2006 | Baker et al. | 379/88.22 |
| 2002/0040297 | A1 | 4/2002 | Tsiao et al. | |
| 2003/0023435 | A1 * | 1/2003 | Josephson | 704/235 |
| 2004/0054541 | A1 * | 3/2004 | Kryze et al. | 704/275 |
| 2005/0137869 | A1 * | 6/2005 | Sihn et al. | 704/258 |
| 2006/0195445 | A1 | 8/2006 | Julia | |

FOREIGN PATENT DOCUMENTS

DE    196 22 603 A1    12/1997

OTHER PUBLICATIONS

Michael Miller:"Ten Minute Guide to Pocket PC 2002" Sep. 5, 2002, Que, XP0024255158 Lesson 11. Working with Files and Folders Printed from Safari Books Online.
Shelley O'Hara: "Absolute Beginner's Guide to Microsoft Windows XP, Second Edition" Jun. 13, 2005, Que, XP002425159 ISBN: 0-7897-3432-X Chapter 3. Managing Files Chapter 11. Playing Music. Playing and Recorder Sounds with Sound Recorder. Printed from Safari Books Online.
"Talk to the Machine" IEEE Spectrum, IEEE Inc. New York, US, vol. 39, No. 9, Sep. 2002, pp. 60-64, 85, XP001117047 ISSN: 0018-9235 the whole document.
Anonymous: "Treo 650"[Online] 2004, pp. 1-2, XP002425155 Retrieved from the Internet: URL:http://www.palm.com/us/products/smartphones/treo650/pdf/datasheet_Treo650.zip> [retrieved on Mar. 16, 2007] the whole document.

* cited by examiner

*Primary Examiner*—David R Hudspeth
*Assistant Examiner*—Brian L Albertalli
(74) *Attorney, Agent, or Firm*—Oppedahl Patent Law Firm LLC

(57) ABSTRACT

A method for use on a hand-held mobile self-powered wireless device including a listing program is provided. The listing programs extracts commands from a user's voice streams and initiates subroutines in response to those commands. For example, the method of the present invention allows a user to navigate through a hierarchy of files and folders, create new files and folders, and manage the contents thereof without the inconvenience of physically manipulating keys or a stylus and without paying visual attention to the device. Further, the method of the present invention allows a user to save voice streams in a desired file and to easily locate and play back the voice streams at a convenient time and place.

21 Claims, 7 Drawing Sheets

| Mobile Listing: Operation Instructions Getting started | | Fig. 2 |
|---|---|---|
| 1.) Load the software on the mobile device. | | |
| 2.) In the device's settings assign a button to the mobile listing program. This button, when pressed, will start the program. Some mobile devices may require the user to press and hold the button for a period of time to start the program (this may be the case on devices with telephone keypads). | A PDA type of device with phone capability might assign buttons A or B to start the Listing program. | 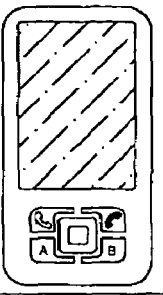 |
| | A telephone device with programming capability might assign a numeric keypad button, such as "4" to be pressed and held for a period of time to start the Listing program. | 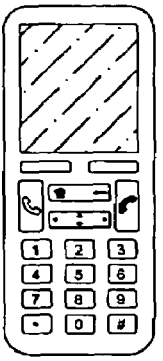 |
| 3.) The speech recognition engine of the mobile listing software will not require training. To begin using the software press the device button assigned to start mobile listing. | If the device has phone capability and a call is in progress the mobile listing software will not start. Phone use is given priority over mobile listing. |  |
| 4.) The mobile device will produce a distinct audible signal (a tone or perhaps "Lister started") to confirm that the program is running. When the program is running and if the mobile device has a user interface screen then a program icon will be displayed in the menu bar. | At right is a possible mobile lister program icon. Such an icon would visually indicate that the mobile listing program is running. | Mobile list program icon 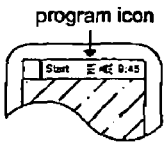 |
| 5.) The main folder is the root folder of all additional folders. Folders are created to hierarchally organize lists. For example, a Home folder can be created to hold folders and lists related to home information. Lists can be created inside the main folder or inside other folders. A Priority list exists in the main folder and can not be deleted. | 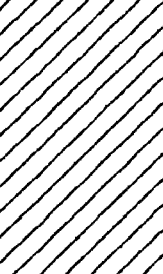 | |

| Mobile Listing: Operation Instructions  Fig. 3 Program startup and mobile listing commands ||| 
|---|---|---|
| 6.) There is Priority list in the Main folder that can not be deleted. Any items in this list are announced whenever the program is started. If no items are in the Priority list the program will procede to examine the program's option settings (see Section 7 below). | A priority list announcement might be:  "Pick up car Friday", "Need inkjet toner". |  |
| 7.) Program options control which list or folder is opened on program start. If a 'use last list' option is set the program opens both the folder containing the last used list and the last used list. This folder and list are announced to the user. If the 'use last folder' option is set the program opens the last used folder and this folder is announced to the user. If neither option is set the program remains in the main folder on program startup. | Example: 'Use last list' announcement: "Groceries list in folder shopping in folder home open".  Example: 'Use last folder' announcement: "Folder shopping in folder home open".  If neither option is set the program will remain in the Main folder and announce "Main folder open". |  |
| 8.) Mobile listing commands are detailed in the box to the right.  Most list commands need to prompt users for information. The responses from users direct the program to perform the desired actions. If users do not clearly understand prompts they may say 'Repeat' to have the prompt repeated. If the program does not received the 'Repeat' or another appropriate command it will reannounce the prompt for information. After a second prompt without an appropriate response from users the software will cancel the current command and announce "Command Cancelled". The listing software will then wait for a new command to be issued from users.  List commands 'Review Items', 'Add Item', 'Delete Item', and 'Delete All Items' can only be used when a list is open. | Open Folder: user is prompted for folder name to be opened.  Open List: user is prompted for list name to be opened.  Create Folder: user spells folder name to create.  Create List: users spells list name to create.  Delete Folder: user speaks folder name to delete.  Delete List: user speaks list name to delete.  Review Folder: program announces all folders and lists in the current folder. When a folder or list name is announced the user may use appropriate 'Delete Folder', 'Open Folder', 'Review Folder', 'Delete List', or 'Open List' command.  Review Items: program announces all list items in the currently opened list. When a list item is announced the user may say 'Delete Item' to delete that list item. The 'Add Item' and 'Delete All Items' commands can be used when reviewing items.  Add Item: user is prompted to say the item to add to a list, such as "milk and eggs". List items are not speech converted to text. Instead they are the digitized sound recordings of a user's speech, saved, and combined with other saved recordings, items, to form a list.  Delete Item: See 'Review Items' command above.  Delete All Items: program confirms that all items are to be deleted from the currently opened list.  Cancel: cancel the current command.  Repeat: repeat the last announcement.  Parent Folder: the opened folder closes and the folder one level up in the folder hierarchy becomes the opened folder.  Main Folder: any opened folder closes and the Main folder becomes the opened folder.  Stop Program: stops the mobile listing program.  Help: announces help options and support.  Folder Commands: announces all commands relevant to working with and navigating through folders.  List Commands: announces all commands relevant to working with a list.  Options: allows users to change program option setttings. | |

| Mobile Listing: Operation Instructions Program shutdown | | | Fig. 4 |
|---|---|---|---|
| 9.) Philosophy teaches that not to act is to act and the mobile listing program is the same. After startup the mobile listing program waits for a list command to be invoked by the user (see section 8, page 2 for list commands). If no command is spoken by the user the software announces "Say a list command or help". This prompt is repeated twice. If no list command is spoken after the second prompt the software will begin stopping the program. Any currently opened folder and list will be noted for later use with startup options (see section 7, page 2). The program icon will be removed from the menu bar and the program will stop. | Say 'Folder Commands' or 'List Commands' to review the available commands or say 'Help' to receive extended help service from the program. | | |
| 10.) As with not invoking a list command (see Section 9 above), not responding to command prompts when executing a command will cancel the command (see Section 8 on page 2 about responding to command prompts). If a user does not respond to command prompts for information the program control will stop executing the command and begin to wait for a new command to be invoked. If the user does not invoke a new command the program will eventually stop running. | It is important for mobile devices to conserve power. Processor power is used whenever the program waits for commands to be received from users. If commands are not being received the program will stop running to save power on the mobile device. | | |
| 11.) A final way to stop the program is for users to issue the 'Stop Program' command. As with Section 9 above, the currently opened folder and list, if applicable, will be noted, the program icon will be removed from the menu bar, and the program will be stopped. | | | |
| | | | |

| Mobile Listing: Operation Instructions Working with lists | | Fig. 5 |
|---|---|---|
| 12.) To create a list first navigate to the folder where the list is to reside (see page 6, Navigating through folders). Lists may also reside in the Main folder. Use the 'Create List' command to begin making a new list. The program will prompt the user to "Spell new list name". Say the letters of the list name clearly. Wait after the last list letter is spoken. The program will then prompt the user to verify creating this list by using text to speech technology to say the spelled list name. | It is possible for list or folder names to be created from a connection to a personal computer or using special input means on some mobile devices. This may be practical when adding several folders or lists. However, the 'Create Folder' and 'Create List' commands should be preferred when a minimum amount of attention can be diverted to the mobile device, such as when driving. |  |
| 13.) To open a list in the current folder use the 'Open List' command. Users will then be prompted to "Say list name to open". Clearly say the list name to open. The program will respond to a match by announcing that the list has been opened. | Lists can also be opened using the 'Review Folder' command. When the list name is announced the user can respond 'Open List' to open the list. |  |
| 14.) To delete a list in the current folder use the 'Delete List' command. Users will then be prompted to "Say list name to delete". Clearly say the list name to delete. If the list name exists the program will announce the name and ask the user to verify deleting this list. | Remember, users can respond with 'Cancel' to cancel a command. |  |
| 15.) When a list is open you may use the 'Review Items' command. After each list item is announce the user may issue a 'Delete Item', 'Add Item', 'Delete All Items', 'Next', or 'Repeat' command. | Items played back with the 'Review Items' command are the digitized sound recordings made when using the 'Add Item' command. |  |
| 16.) If a list is open the 'Add Item' command can be used to add additional items to the list. The program will prompt users to "Say item". Clearly speak the item. Wait after speaking the item. The program will then prompt the user to verify adding the item. | Important: the items added with the 'Add Item' command are digitized sound recordings of the user's speech, not speech to text conversions. |  |
| 17.) The 'Delete Item' command can be used in conjunction with the 'Review Items' command. When using the 'Review Item' command and a list item is spoken, say 'Delete Item' to delete the item. | |  |
| 18.) If a list is open the 'Delete All Items' command can be used to delete all items in a list. The program will ask the user to verify deleting all items. | Remember, users can respond with 'Cancel' to cancel a command. |  |

Mobile Listing: Operation Instructions
Working with folders

Fig. 6

| | | |
|---|---|---|
| 19.) To create a folder first navigate to the folder where the new folder is to reside (see page 6, Navigating through folders). Use the 'Create Folder' command to make a folder. The program will prompt the user to "Spell folder name". Say the letters of the folder name clearly. Wait after the last folder letter is spoken. The program will then prompt the user to verify creating this folder by using text to speech technology to say the spelled folder name. | To create a "Shopping" folder in the folder "Home", first open the "Home" folder.<br><br>Main Folder<br>→ Home (Folder)　Work (Folder)　Priority (List)<br>↓<br>Repairs (Folder)<br><br>With the "Home" folder open use the 'Create Folder' command to create a new "Shopping" folder. Note that the "Home" folder remains open after the new folder is created.<br><br>Main Folder<br>→ Home (Folder)　Work (Folder)　Priority (List)<br>↓<br>Repairs (Folder)　Shopping (Folder) | |
| 20.) To open a folder in the current folder use the 'Open Folder' command. Users will then be prompted to "Say folder name to open". Clearly say the folder name to open. The program will respond to a match by announcing that the folder has been opened. | Folders can also be opened using the 'Review Folder' command. When the folder name is announced the user can respond 'Open Folder' to open the folder. | |
| 21.) Use the 'Review Folder' command to review both the folder and list names in the currently opened folder. After each folder or list name is announced the user may issue an appropriate 'Open Folder', 'Delete Folder', 'Review Folder', 'Open List', 'Delete List', or 'Review List' command. | When a folder name is announced and a user issues a 'Review Folder' command this folder will open.<br><br>When a list name is announced and a user issues a 'Review List' command this list will open. | |
| 22.) The 'Delete Folder' command is used to delete the currently opened folder. Users will be prompted as to whether the folder is empty of contents. The current folder will become the parent folder of the deleted folder.<br><br>The Main folder can not be deleted. | To delete the "Shopping" folder first open the "Shopping" folder.<br><br>Main Folder<br>→ Home (Folder)　Work (Folder)　Priority (List)<br>↓<br>Shopping (Folder)<br><br>With the "Shopping" folder open use the 'Delete Folder' command to delete this folder.<br><br>Main Folder<br>→ Home (Folder)　Work (Folder)　Priority (List) | |

Mobile Listing: Operation Instructions
Navigating through folders

Fig. 7

| | | |
|---|---|---|
| 23.) To move deeper into a folder hierarchy use the 'Open Folder' command. | A.) Use 'Open Folder' and "Home" to open the "Home" folder from the Main folder.<br><br>Main Folder<br>— Home (Folder)  Work (Folder)  Priority (List)<br><br>B.) Use 'Open Folder' and "Shopping" to open the "Shopping" folder from the "Home" folder.<br><br>Main Folder<br>— Home (Folder)  Work (Folder)  Priority (List)<br>— Repairs (Folder)  Shopping (Folder) | 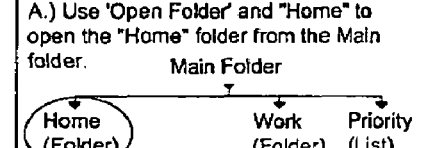 |
| 24.) To move up a level in a folder hierarchy use the 'Parent Folder' command. | Main Folder<br>— Home (Folder)  Work (Folder)  Priority (List)<br>— Repairs (Folder)  Shopping (Folder)<br><br>A.) Use 'Parent Folder' to move from the "Shopping" folder up to the "Home" folder.<br><br>Main Folder<br>— Home (Folder)  Work (Folder)  Priority (List)<br>— Repairs (Folder)  Shopping (Folder) | 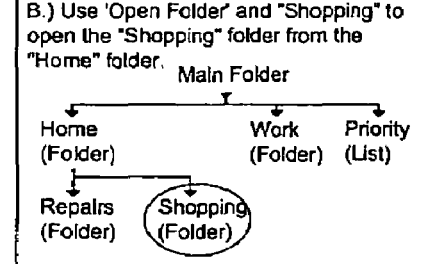 |
| 25.) Use the "Main Folder" command to move to the Main folder. | Main Folder<br>— Home (Folder)  Work (Folder)  Priority (List)<br>— Repairs (Folder)  Shopping (Folder)<br><br>A.) Use 'Main Folder' to move to the Main folder.<br><br>Main Folder<br>— Home (Folder)  Work (Folder)  Priority (List) |  |

MOBILE LISTING SYSTEM

CROSS REFERENCE TO RELATED APPLICATIONS

This application claims the benefit of U.S. provisional application No. 60/727,356 filed on Oct. 17, 2005, which is herein incorporated by reference.

BACKGROUND

A shopper often enters a store with the intention of buying numerous items. Unfortunately, after leaving the store the shopper is all-to-often confronted with the problem of having forgotten to purchase a specific item, for example, forgetting to purchase milk or eggs. In the past this regrettable situation was averted by writing down, on paper, a list of items to purchase from the store, for example, generating a grocery list. However, lists written on paper were easily lost or destroyed.

With the advent of modern computing, a shopper was able to generate shopping lists on a less easily lost or destroyed device such as on a personal computer (PC) or on a personal data assistant (PDA), for example, a Palm Pilot or a Blackberry. The user of such a device could then consult the shopping list whilst in the store, to ensure that an item was not forgotten. However, when generating a shopping list on a PC or a PDA, a shopper was required to use a human input device such as a mouse, a keyboard, or a stylus. The use of such a human input device was also required to review the list.

The use of a PDA or PC to generate a list also required the visual attention of the user as well as the physical manipulation of the human input device. Physically impaired users, such as the blind, were not able to use the PDA or the PC for generating shopping lists. Further, the operation of the PDA or PC required the user's undivided attention thereby making it difficult and dangerous to generate a shopping list and perform another task, such as driving, at the same time. It would be extremely beneficial to provide a device that solves the problems of the prior art.

SUMMARY OF INVENTION

A method for use on a hand-held mobile self-powered wireless device including a listing program is provided. The listing programs extracts commands from a user's voice streams and initiates subroutines in response to those commands. For example, the method of the present invention allows a user to navigate through a hierarchy of files and folders, create new files and folders, and manage the contents thereof by voice command and without the inconvenience of physically manipulating keys or a stylus and without paying visual attention to the device. Further, the method of the present invention safely allows a user to save voice streams in a desired location and to easily locate and play back the saved voice streams at a convenient time and place.

DESCRIPTION OF DRAWING

FIGS. 2-7 are instruction sheets detailing instructions for a user to operate the hand-held mobile self-powered wireless device in accordance with an exemplary embodiment of the present invention.

DETAILED DESCRIPTION

Figure 1:
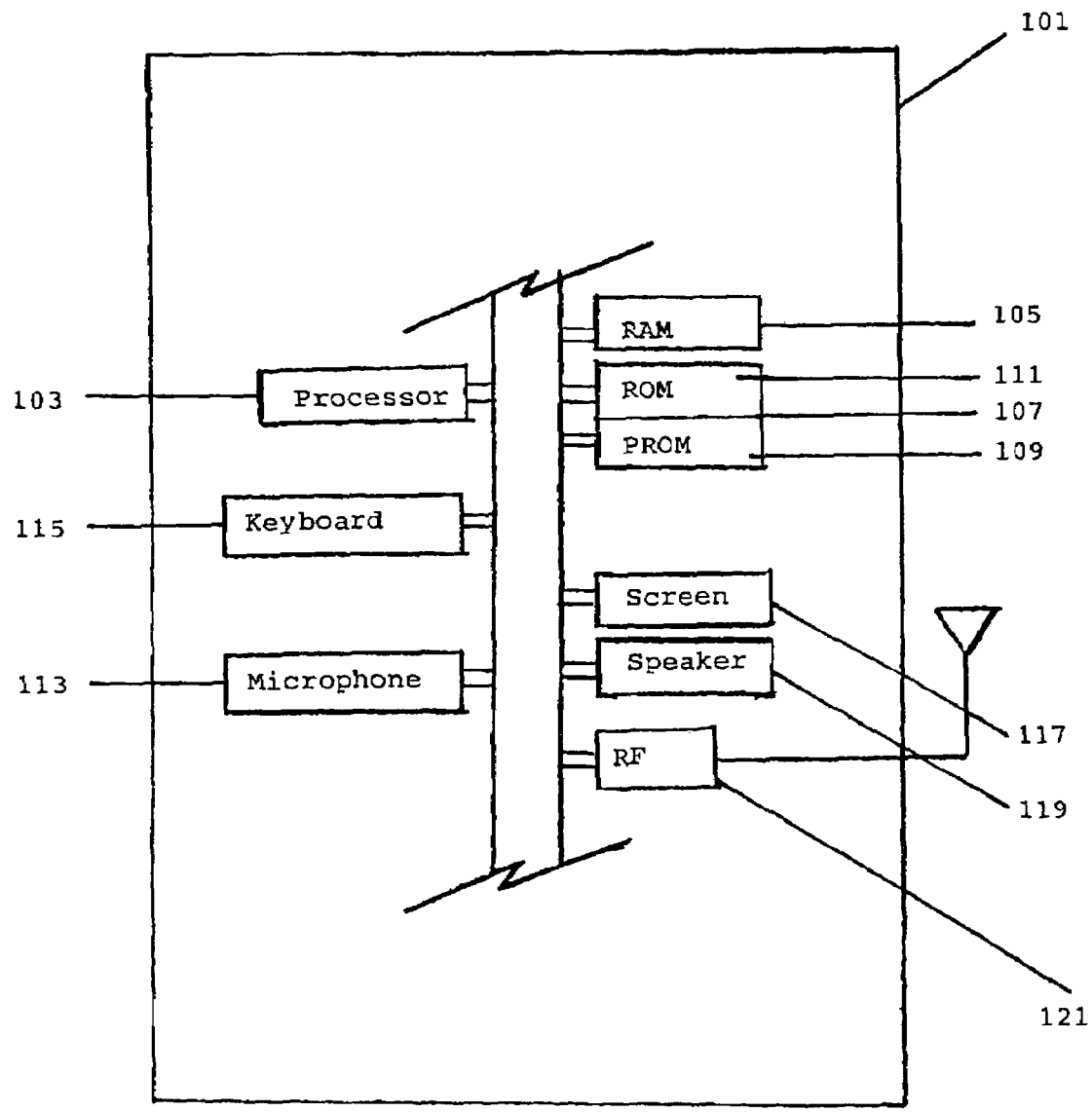
FIG. 1 is a functional block diagram of the hardware of the hand-held mobile self-powered wireless device.

A method for use and a hand-held mobile self-powered wireless device including a listing program is provided. The method and hand-held mobile self-powered wireless device of the present invention solve the problems of the prior art by safely allowing a user to navigate through and to manage a hierarchy of folders and files without the visual attention of the user and without the physical manipulation of the keys or the stylus of the device. Further, a user, with the same conveniences, may now save voice streams in a desired location on the device and play back saved voice streams at a preferred time and place. Thus, physically impaired users such as the blind, are now able to create and manage files on an electronic device while others can safely perform other tasks, such as driving, while using the device. Further, a user can now generate, play back and manage reminder lists, such as shopping lists, wish lists, or to-do lists with voice commands.

In accordance with an embodiment of the present invention, a method is provided for use on a hand-held mobile self-powered wireless device. The device comprises: a listing program; a memory having a file storage directory comprising a hierarchy of folders, files stored within the hierarchy of folders, and voice streams stored within files stored within the hierarchy of folders; a human input device; an audio output device; and a microprocessor, wherein each of the listing program, the memory, the human input device, and the audio output device are coupled through the microprocessor.

FIG. 1 shows the hardware of a hand-held mobile self-powered wireless device 101 in accordance with an embodiment of the present invention. The hardware includes a microprocessor 103, RAM 105, permanent memory 107 which may be field-programmed PROM 109 (e.g. flash memory) or factory-masked ROM 111, or both as depicted in this particular embodiment. The hardware also includes a microphone 113, a keyboard 15, a screen 117, a speaker 119, and a RF transmitter/receiver 121. Each of the microprocessor 103, RAM 105, permanent memory 107, microphone 113, keyboard 115, screen 117, speaker 119, and RF transmitter/receiver 121 coupled by electronic wiring 123. A listing program, comprising a speech recognition engine, a text-to-speech engine, and a plurality of subroutines that are initiated in response to commands extracted by the listing program from a user's voice streams, is stored within the permanent memory 107. An example of the means for initiating the listing program stored in the permanent memory 107, being a key on keyboard 115. An example of the means for obtaining a voice stream said by user comprising a command, being the microprocessor 103 executing the appropriate software. An example of the means for extracting commands from voice streams said by the user, being the microprocessor 103 executing the appropriate software. An example of other means, being the microprocessor 103 executing the appropriate software.

The hand-held mobile self-powered device is not particularly limited and can be, for example, a cell phone or a personal data assistant (PDA) such as a Blackberry or Palm Pilot. The listing program may come resident on the device from a retailer or it may be purchased separately from the device and subsequently loaded into the permanent memory by a user. Once the listing program is loaded on the device it may be initiated by the user. In one embodiment it is envisioned that the listing program is initiated by pressing a button on the device.

Once the listing program is initiated by the user, the user may then say a voice stream comprising a command. The human input device, which is coupled to the listing program through the microprocessor of the hand-held mobile self-powered wireless device, then obtains the voice stream said by the user. The human input device is not particularly limited so long as it is able to receive a voice stream and convert it to an electronic signal. It is herein preferred that the human input device is a microphone. The audio output device, which is coupled to the listing program is not particularly limited either, so long as it is able to convert an electronic signal into an audio output. It is herein preferred that the audio output device is a speaker.

The listing program comprises a speech recognition engine, a text-to-speech engine, and a plurality of subroutines that are initiated in response to commands extracted by the listing program from a user's voice streams. The speech recognition engine and text-to-speech engines are not particularly limited as such applications are well known in the art. Examples of a speech recognition engines and a text-to-speech engines suitable for use with the listing program of the present invention are those offered by Fonix, Inc.

The listing program extracts commands from the voice streams said by user. The commands extracted from the voice streams are commands that are indicative of a user's desires to: (1) open a main folder located in the file storage directory of the hand-held mobile self-powered wireless device; (2) open a parent folder of a currently open folder or file located in the file storage directory of the hand-held mobile self-powered wireless device; (3) open a folder located in a currently open folder in the file storage directory of the hand-held mobile self-powered wireless device; (4) open a file located in a currently open folder in the file storage directory of the hand-held mobile self-powered wireless device; (5) create a folder to be located in a currently open folder in the file storage directory of the hand-held mobile self-powered wireless device; (6) create a file to be located in a currently open folder in the file storage directory of the hand-held mobile self-powered wireless device; (7) delete a folder located in a currently open folder in the file storage directory of the hand-held mobile self-powered wireless device; (8) delete a file located in a currently open folder in the file storage directory of the hand-held mobile self-powered wireless device; (9) review and manage folders and files located in a currently open folder in the file storage directory of the hand-held mobile self-powered wireless device; (10) review and manage voice streams saved in a currently open file located in the file storage directory of the hand-held mobile self-powered wireless device; (11) save a voice stream in a currently open file located in the file storage directory of the hand-held mobile self-powered wireless device; and (12) delete all voice streams located in a currently open file located in the file storage directory of the hand-held mobile self-powered wireless device. In response to the command extracted from the user's voice stream, the listing program then initiates a subroutine.

(1) Open main folder

When a command extracted from a voice stream is indicative of a user's desire to: (1) open the main folder located in the file storage directory of the hand-held mobile self-powered wireless device, the listing program initiates an "open main folder" subroutine. This subroutine comprises the steps of:

(i) by the listing program, opening the main folder located in the file storage directory.

(2) Open parent folder

When a command extracted from a voice stream is indicative of a user's desire to: (2) open the parent folder of the currently open folder or file located in the file storage directory of the hand-held mobile self-powered wireless device, by the listing program, initiating an "open parent folder" subroutine comprising the steps of:

(i) by the listing program, opening the parent folder of the currently open folder or file located in the file storage directory.

(3) Open folder

When a command extracted from a voice stream is indicative of a user's desire to: (3) open a folder located in a currently open folder in the file storage directory of the hand-held mobile self-powered wireless device, the listing program, initiates an "open folder" subroutine. This subroutine comprises the steps of:

(i) by the listing program, sending an audible request comprising instructions for the user to say a voice stream comprising the name of the folder the user desires to be opened, to the user through the audio output device of the hand-held mobile self-powered wireless device, (ii) by the user of the hand-held mobile self-powered wireless device, saying the voice stream comprising the name of the folder the user desires to be opened, (iii) by the human input device of the hand-held mobile self-powered wireless device, obtaining the voice stream comprising the name of the folder the user desires to be opened, (iv) by the listing program, performing a speech-to-text conversion on the voice stream comprising the name of the folder the user desires to be opened, (v) by the listing program, comparing the text-converted voice stream comprising the name of the folder the user desires to be opened to the names of folders located in a currently open folder in the file storage directory, (vi) in the event that the listing program matches the text-converted voice stream comprising the name of the folder the user desires to be opened and a name of a folder located in the currently open folder in the file storage directory, by the listing program, opening the matching folder located in a currently open folder in the file storage directory, and (vii) in the event that the listing program does not match the text-converted voice stream comprising the name of the folder the user desires to be opened and a name of a folder located in the currently open folder in the file storage directory, by the listing program, (A) sending an audible request comprising instructions for the user that the folder does not exist in the currently open folder in the file storage directory, to the user through the audio output device of the hand-held mobile self-powered wireless device, and (B) looping back to step (i) of this subroutine.

The user may be required to say the folder name using the individual characters of the folder name spelled out.

(4) Open file

When a command extracted from a voice stream is indicative of a user's desire to: (4) open a file located in a currently open folder in the file storage directory of the hand-held mobile self-powered wireless device, the listing program initiates an "open file" subroutine. This subroutine comprises the steps of:

(i) by the listing program, sending an audible request comprising instructions for the user to say a voice stream comprising the name of the file the user desires to be opened, to the user through the audio output device of the hand-held mobile self-powered wireless device, (ii) by the user of the hand-held mobile self-powered wireless device, saying the voice stream comprising the name of the file the user desires to be opened, (iii) by the human input device of the hand-held mobile self-powered wireless device, obtaining the voice stream comprising the name of the file the user desires to be opened, (iv) by the listing program, performing a speech-to-text conversion on the voice stream comprising the name of the file the user desires to be opened, (v) by the listing program, comparing the text-converted voice stream comprising the name of the file the user desires to be opened to names of files located in the currently open folder in the file storage directory, (vi) in the event that the listing program matches the text-converted voice stream comprising the name of the file the user desires to be opened and a name of a file located in the currently open folder in the file storage directory, by the listing program, opening the matching file located in the currently open folder in the file storage directory, and (vii) in the event that the listing program does not match the text-converted voice stream comprising the name of the file the user desires to be opened and a name of a file located in the currently open folder in the file storage directory, by the listing program, (A) sending an audible request comprising instructions that the file does not exist in the currently open folder in the file storage directory, to the user through the audio output device of the hand-held mobile self-powered wireless device, and (B) looping back to step (i) of this subroutine.

The user may be required to say the file name using the individual characters of the file name spelled out.

(5) Create folder

When a command extracted from a voice stream is indicative of a user's desire to: (5) create a folder to be located in a currently open folder in the file storage directory of the hand-held mobile self-powered wireless device, the listing program initiates a "create folder" subroutine. This subroutine comprises the steps of:

(i) by the listing program, sending an audible request comprising instructions for the user to say a voice stream comprising the name of the folder the user desires to be created, to the user through the audio output device of the hand-held mobile self-powered wireless device, (ii) by the user of the hand-held mobile self-powered wireless device, saying the voice stream comprising the name of the folder the user desires to be created, (iii) by the human input device of the hand-held mobile self-powered wireless device, obtaining the voice stream comprising the name of the folder the user desires to be created, (iv) by the listing program, performing a speech-to-text conversion on the voice stream comprising the name of the folder the user desires to be created, (v) by the listing program, comparing the text-converted voice stream comprising the name of the folder the user desires to be created to names of folders located in the currently open folder in the file storage directory, (vi) in the event that the listing program matches the text-converted voice stream comprising the name of the folder the user desires to be created and a name of a folder located in the currently open folder of the file storage directory, by the listing program, (A) sending an audible comprising instructions that the folder name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the folder the user desires to be created and a name of a folder located in the currently open folder in the file storage directory, by the listing program, creating a folder with the text-converted voice stream comprising the name of the folder the user desires to be created in the currently open folder of the file storage directory.

Depending on the performance of the speech recognition engine selected (i.e. the depth of vocabulary that the engine recognizes) and the corresponding name of the folder that the user desires to be created, the user may be required to say the folder name using the individual characters of the folder name spelled out.

(6) Create file

When a command extracted from a voice stream is indicative of a user's desire to: (6) create a file to be located in a currently open folder in the file storage directory of the hand-held mobile self-powered wireless device, the listing program initiates a "create file" subroutine. This subroutine comprises the steps of:

(i) by the listing program, sending an audible request comprising instructions for the user to say a voice stream comprising the name of the file the user desires to be created, to the user through the audio output device of the hand-held mobile self-powered wireless device, (ii) by the user of the hand-held mobile self-powered wireless device, saying the voice stream comprising the name of the file the user desires to be created, (iii) by the human input device of the hand-held mobile self-powered wireless device, obtaining the voice stream comprising the name of the file the user desires to be created, (iv) by the listing program, performing a speech-to-text conversion on the voice stream comprising the name of the file the user desires to be created, (v) by the listing program, comparing the text-converted voice stream comprising the name of the file the user desires to be created to names of files located in the currently open folder in the folder in the file storage directory, (vi) in the event that the listing program matches the text-converted voice stream comprising the name of the file the user desires to be created and a name of a file located in the currently open folder in the file storage directory, by the listing program, (A) sending an audible request comprising instructions that the file name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the file the user desires to be created and a name of a file in the currently open folder located in the file storage directory, by the listing program, creating a file with the text-converted voice stream comprising the name of the file the user desires to be created in the currently open folder of the file storage directory.

Depending on the performance of the speech recognition engine selected (i.e. the depth of vocabulary that the engine recognizes) and the corresponding name of the file that the user desires to be created, the user may be required to say the file name using the individual characters of the file name spelled out.

(7) Delete folder

When a command extracted from a voice stream is indicative of a user's desire to: (7) delete a folder located in a currently open folder in the file storage directory of the hand-held mobile self-powered wireless device, the listing program initiates a "delete folder" subroutine. This subroutine comprises the steps of:

(i) by the listing program, sending an audible request comprising instructions for the user to say a voice stream comprising the name of the folder the user desires to be deleted, to the user through the audio output device of the hand-held mobile self-powered wireless device, (ii) by the user of the hand-held mobile self-powered wireless device, saying the voice stream comprising the name of the folder the user desires to be deleted, (iii) by the human input device of the hand-held mobile self-powered wireless device, obtaining the voice stream comprising the name of the folder the user desires to be deleted, (iv) by the listing program, performing a speech-to-text conversion on the voice stream comprising the name of the folder the user desires to be deleted, (v) by the listing program, comparing the text-converted voice stream comprising the name of the folder the user desires to be deleted to names of folders located in the currently open folder in the file storage directory, (vi) in the event that the listing program matches the text-converted voice stream comprising the name of the folder the user desires to be deleted and a name of a folder located in the currently open folder in the folder storage directory, by the listing program, deleting the matching folder in the currently open folder in the file storage directory, and (vii) in the event that the listing program does not match the text-converted voice stream comprising the name of the folder the user desires to be deleted and a name of a folder in the currently open folder located in the file storage directory, by the listing program, (A) sending an audible request comprising instructions that the folder name does not exist in the currently open folder located in file storage directory, to the user through the audio output device of the hand-held mobile self-powered wireless device, and (B) looping back to step (i) of this subroutine.

The user may be required to say the folder name using the individual characters of the folder name spelled out.

(8) Delete file

When a command extracted from a voice stream is indicative of a user's desire to: (8) delete a file located in a currently open folder in the file storage directory of the hand-held mobile self-powered wireless device, the listing program initiates a "delete file" subroutine. This subroutine comprises the steps of:

(i) by the listing program, sending an audible request comprising instructions for the user to say a voice stream comprising the name of the file the user desires to be deleted, to the user through the audio output device of the hand-held mobile self-powered wireless device, (ii) by the user of the hand-held mobile self-powered wireless device, saying the voice stream comprising the name of the file the user desires to be deleted, (iii) by the human input device of the hand-held mobile self-powered wireless device, obtaining the voice stream comprising the name of the file the user desires to be deleted, (iv) by the listing program, performing a speech-to-text conversion on the voice stream comprising the name of the file the user desires to be deleted, (v) by the listing program, comparing the text-converted voice stream comprising the name of the file the user desires to be deleted to names of files located in the currently open folder in the file storage directory, (vi) in the event that the listing program matches the text-converted voice stream comprising the name of the file the user desires to be deleted and a name of a file located in the currently open folder in the file storage directory, by the listing program, deleting the matching file in the currently open folder in the file storage directory, and (vii) in the event that the listing program does not match the text-converted voice stream comprising the name of the file the user desires to be deleted and a name of a file in the currently open folder located in the file storage directory, by the listing program, (A) sending an audible request comprising instructions that the file name does not exist in the currently open folder located in file storage directory, to the user through the audio output device of the hand-held mobile self-powered wireless device, and (B) looping back to step (i) of this subroutine.

The user may be required to say the file name using the individual characters of the file name spelled out.

(9) Review folder

When a command extracted from a voice stream is indicative of a user's desire to: (9) review and manage folders and files located in a currently open folder in the file storage directory of the hand-held mobile self-powered wireless device, the listing program initiates a "review folder" subroutine. This subroutine comprises the steps of:

(i) by the listing program, performing a text-to-voice conversion on the names of the names of the folders and files located in the currently open folder in the file storage directory, (ii) by the listing program, sequentially announcing, to a user, the voice conversions of the names of the folders and files located in the currently open folder in the file storage directory through the audio output device of the hand-held mobile self-powered wireless device, (iii) in the event that the user of the hand-held mobile self-powered wireless device desires to delete a file or folder announced during step (ii) of this subroutine, by the user, saying a voice stream comprising a command indicative of the user's desire to delete the file or folder that had been announced immediately prior, by the human input device of the hand-held mobile self-powered wireless device, obtaining the voice stream comprising the command indicative of the user's desire to delete the file or folder that had been announced immediately prior, and by the listing program of the hand-held mobile self-powered wireless device, (A) extracting the command from the voice stream indicative of the user's desire to delete the file or folder that had been announced immediately prior, and
(B) deleting the file or folder in the file storage directory in response to the command extracted from the user's voice stream, and (iv) in the event that the user of the hand-held mobile self-powered wireless device desires to open a file or folder announced during step (ii) of this subroutine,
by the user, saying a voice stream comprising a command indicative of the user's desire to open the file or folder that had been announced immediately prior,
by the human input device of the hand-held mobile self-powered wireless device, obtaining the voice stream comprising the command indicative of the user's desire to open the file or folder that had been announced immediately prior, and
by the listing program of the hand-held mobile self-powered wireless device,
(A) extracting the command from the voice stream indicative of the user's desire to open the file or folder that had been announced immediately prior, and
(B) opening the file or folder in the file storage directory in response to the command extracted from the user's voice stream.

(10) Review voice streams

When a command extracted from a voice stream is indicative of a user's desire to: (10) review and manage voice streams saved in a currently open file located in the file storage directory of the hand-held mobile self-powered wireless device, the listing program initiates a "review voice streams" subroutine. This subroutine comprises the steps of:
(i) by the listing program, sequentially announcing, to the user, the voice stream files located in the currently open file in the file storage directory through the audio output device of the hand-held mobile self-powered wireless device, and
(ii) in the event that the user of the hand-held mobile self-powered wireless device desires to delete a voice stream announced during step (i) of this subroutine,
by the user, saying a voice stream comprising a command indicative of the user's desire to delete the voice stream that had been announced immediately prior,
by the human input device of the hand-held mobile self-powered wireless device, obtaining the voice stream comprising the command indicative of the user's desire to delete the voice stream that had been announced immediately prior, and
by the listing program of the hand-held mobile self-powered wireless device,
(A) extracting the command from the voice stream indicative of the user's desire to delete the voice stream that had been announced immediately prior, and
(B) deleting the voice stream from the file located in the file storage directory in response to the command extracted from the user's voice stream.

(11) Save voice stream

When a command extracted from a voice stream is indicative of a user's desire to: (11) save a voice stream in a currently open file located in the file storage directory of the hand-held mobile self-powered wireless device, the listing program initiates a "save voice stream" subroutine. This subroutine comprises the steps of:

(i) by the listing program, sending an audible request comprising instructions for the user to say a desired voice stream to be recorded in the currently open file in the file storage directory, to the user through the audio output device of the hand-held mobile self-powered wireless device,
(ii) by the user of the hand-held mobile self-powered wireless device, saying the desired voice stream to be recorded in the currently open file in the file storage directory,
(iii) by the human input device of the hand-held mobile self-powered wireless device, obtaining the voice stream comprising the desired voice stream to be recorded in the currently open file in the file storage directory, and
(iv) by the listing program, saving the voice stream as a sound file in the currently open file in the file storage directory.

To accommodate voice streams of varying length and to save such efficiently, it is preferred that the listing program recognize when a user's voice streams have stopped and to save the voice streams up to their stopping point.

(12) Delete all voice streams

When a command extracted from a voice stream is indicative of a user's desire to: (12) delete all voice streams located in a currently open file located in the file storage directory of the hand-held mobile self-powered wireless device, the listing program initiates a "delete all voice streams" subroutine. This subroutine comprises the steps of:
(i) deleting all voice streams located in the currently open file in the file storage directory.

With reference to the concepts of saving voice streams in a file, reviewing voice streams located in a file, and deleting voice streams in a file, it is herein understood that the voice streams are stored in the file itself or in a location associated with the file.

Other commands extracted from the user's voice streams may be commands that are indicative of a user's desires to: (13) stop the listing program; (14) cancel the current subroutine; and (15) list the commands that the listing program recognizes.

(13) Stop program

When a command extracted from a voice stream is indicative of a user's desire to: (13) stop the listing program, the listing program initiates a "stop program" subroutine. This subroutine comprises the steps of:
(i) by the listing program, stopping the program.

(14) Cancel

When a command extracted from a voice stream is indicative of a user's desire to: (14) cancel the current subroutine, the listing program initiates a "cancel" subroutine. This subroutine comprises the steps of:
(i) by the listing program, canceling the currently running subroutine, and
(ii) sending an audible request comprising instructions for the user that the currently running subroutine has been canceled and for the user to say a voice stream comprising a command.

(15) List commands

When a command extracted from a voice stream is indicative of a user's desire to: (15) list the commands that the listing program recognizes, the listing program initiates a "list commands" subroutine. This subroutine comprises the steps of:

(i) by the listing program, listing the commands that the listing program recognizes.

In another embodiment, the hand-held mobile self-powered wireless device is communicatively coupled to a wide-area wireless communications network enabled with file sharing. In this embodiment the device is able to send a file or files located in the file directory over the wide-area wireless communications network to a second hand-held mobile self-powered wireless device that is coupled to the wide-area wireless communications network.

In a further embodiment, the listing program comprises a "self shutdown" subroutine initiated when a user fails to say a voice stream comprising a command for a period of time greater than 10 seconds, more preferably greater than 20 seconds, and still more preferably greater than 30 seconds. The "self shutdown" subroutine comprises the steps of:

(i) by the listing program, stopping the program.

In another embodiment, the hand-held mobile self-powered wireless device may be communicatively coupled to a personal computer. In this embodiment a user is able to create a file, a folder, or both a file and a file folder on a personal computer and subsequently load it into the file storage directory of the hand-held mobile self-powered wireless device for access thereon by a user.

FIGS. 2-7 comprise a series of instruction sheets for a user detailing the operation of a hand-held mobile self-powered wireless device in accordance with an exemplary embodiment of the present invention.

FIG. 2 Details Instructions Instruction Steps 1-5
  (Step 1) Details instructions for a user to load the listing program onto a PDA or cell phone in the event that the device does not contain the listing software of the present invention.
  (Step 2) Details instructions for the user to assign a button on the PDA or cell phone to be used for the quick initiation of the listing program.
  (Step 3) The user is directed to initiate the listing program by using the quick start button assigned in step two.
  (Step 4) Details instructions for ensuring that the program is running.
  (Step 5) Details an exemplary hierarchy of folders and files (lists) that can be created and managed.

FIG. 3 Details Instructions Instruction Steps 6-8
  (Step 6) Details the use of a priority folder.
  (Step 7) Details the 'use last list' and 'use last folder' program options.
  (Step 8) Details the mobile listing commands that the listing program may extract from a user's voice streams.

FIG. 4 Details Instructions Instruction Steps 9-11
  (Steps 9 and 10) Detail the listing program's actions that it will take in response to inaction by the user.
  (Step 11) Details instruction for the user to stop the listing program FIG. 5 Details Instructions Instruction Steps 12-18
  (Step 12) Details instructions for a user to create a file/list.
  (Step 13) Details instructions for a user to open a file/list.
  (Step 14) Details instructions for a user to delete a file/list.
  (Step 15) Details instructions for a user to review voice files/items stored in a file/list.
  (Step 16) Details instructions for a user to add a voice file/item to a file/list.
  (Step 17) Details instructions for a user to delete voice files/items stored in a file/list.
  (Step 18) Details instructions for a user to delete all voice files/items stored in a file/list.

FIG. 6 Details Instructions Instruction Steps 19-22
  (Step 19) Details instructions for a user to create a folder.
  (Step 20) Details instructions for a user to open a folder.
  (Step 21) Details instructions for a user to review a folder.
  (Step 22) Details instructions for a user to delete a folder.

FIG. 7 Details Instructions Instruction Steps 23-25
  (Steps 23-25) Detail instructions for a user to navigate through the hierarchy of folders.

The invention claimed is:

1. A method for use on a hand-held mobile self-powered wireless device comprising: a listing program comprising a speech recognition engine, a text-to-speech engine, and a plurality of subroutines that are initiated in response to commands extracted by the listing program from a user's voice streams; a memory having a file storage directory comprising a hierarchy of folders, files stored within the hierarchy of folders, and voice streams stored within files stored within the hierarchy of folders; a human input device; an audio output device; and a microprocessor, wherein each of the listing program, the memory, the human input device, and the audio output device are coupled through the microprocessor, the method comprising the steps of:

by the user of the hand-held mobile self-powered wireless device, initiating the listing program of the hand-held mobile self-powered wireless device, by the user, saying a voice stream comprising a command, by the human input device coupled to the listing program through the microprocessor of the hand-held mobile self-powered wireless device, obtaining a voice stream said by user comprising a command, by the listing program of the hand-held mobile self-powered wireless device, extracting commands from voice streams said by the user, wherein the commands extracted from the voice streams comprise commands that are indicative of a user's desires to: (1) open a main folder located in the file storage directory of the hand-held mobile self-powered wireless device; (2) open a parent folder of a currently open folder or file located in the file storage directory of the hand-held mobile self-powered wireless device; (3) open a folder located in a currently open folder in the file storage directory of the hand-held mobile self-powered wireless device; (4) open a file located in a currently open folder in the file storage directory of the hand-held mobile self-powered wireless device; (5) create a folder to be located in a currently open folder in the file storage directory of the hand-held mobile self-powered wireless device; (6) create a file to be located in a currently open folder in the file storage directory of the hand-held mobile self-powered wireless device; (7) delete a folder located in a currently open folder in the file storage directory of the hand-held mobile self-powered wireless device; (8) delete a file located in a currently open folder in the file storage directory of the hand-held mobile self-powered wireless device; (9) review and manage folders and files located in a currently open folder in the file storage directory of the hand-held mobile self-powered wireless device; (10) review and manage voice streams saved in a currently open file located in the file storage directory of the hand-held mobile self-powered wireless device; (11) save a voice stream in a currently open file located in the file storage directory of the hand-held mobile self-powered wireless device; and (12) delete all voice streams located in a currently open file located in the file storage directory of the hand-held mobile self-powered wireless device;

when a command extracted from a voice stream is indicative of a user's desire to: (1) open the main folder located in the file storage directory of the hand-held mobile self-powered wireless device, by the listing program, initiating an "open main folder" subroutine comprising the steps of:
  (i) by the listing program, opening the main folder located in the file storage directory, when a command extracted from a voice stream is indicative of a user's desire to: (2) open the parent folder of the currently open folder or file located in the file storage directory of the hand-held mobile self-powered wireless device, by the listing program, initiating an "open parent folder" subroutine comprising the steps of:
  (i) by the listing program, opening the parent folder of the currently open folder or file located in the file storage directory, when a command extracted from a voice stream is indicative of a user's desire to: (3) open a folder located in a currently open folder in the file storage directory of the hand-held mobile self-powered wireless device, by the listing program, initiating an "open folder" subroutine comprising the steps of:
  (i) by the listing program, sending an audible request comprising instructions for the user to say a voice stream comprising the name of the folder the user desires to be opened, to the user through the audio output device of the hand-held mobile self-powered wireless device,
  (ii) by the user of the hand-held mobile self-powered wireless device, saying the voice stream comprising the name of the folder the user desires to be opened,
  (iii) by the human input device of the hand-held mobile self-powered wireless device, obtaining the voice stream comprising the name of the folder the user desires to be opened,
  (iv) by the listing program, performing a speech-to-text conversion on the voice stream comprising the name of the folder the user desires to be opened,
  (v) by the listing program, comparing the text-converted voice stream comprising the name of the folder the user desires to be opened to the names of folders located in a currently open folder in the file storage directory,
  (vi) in the event that the listing program matches the text-converted voice stream comprising the name of the folder the user desires to be opened and a name of a folder located in the currently open folder in the file storage directory, by the listing program, opening the matching folder located in a currently open folder in the file storage directory, and
  (vii) in the event that the listing program does not match the text-converted voice stream comprising the name of the folder the user desires to be opened and a name of a folder located in the currently open folder in the file storage directory, by the listing program,
    (A) sending an audible request comprising instructions for the user that the folder does not exist in the currently open folder in the file storage directory, to the user through the audio output device of the hand-held mobile self-powered wireless device, and
    (B) looping back to step (i) of this subroutine, when a command extracted from a voice stream is indicative of a user's desire to: (4) open a file located in a currently open folder in the file storage directory of the hand-held mobile self-powered wireless device, by the listing program, initiating an "open file" subroutine comprising the steps of:
  (i) by the listing program, sending an audible request comprising instructions for the user to say a voice stream comprising the name of the file the user desires to be opened, to the user through the audio output device of the hand-held mobile self-powered wireless device,
  (ii) by the user of the hand-held mobile self-powered wireless device, saying the voice stream comprising the name of the file the user desires to be opened,
  (iii) by the human input device of the hand-held mobile self-powered wireless device, obtaining the voice stream comprising the name of the file the user desires to be opened,
  (iv) by the listing program, performing a speech-to-text conversion on the voice stream comprising the name of the file the user desires to be opened,
  (v) by the listing program, comparing the text-converted voice stream comprising the name of the file the user desires to be opened to names of files located in the currently open folder in the file storage directory,
  (vi) in the event that the listing program matches the text-converted voice stream comprising the name of the file the user desires to be opened and a name of a file located in the currently open folder in the file storage directory, by the listing program, opening the matching file located in the currently open folder in the file storage directory, and
  (vii) in the event that the listing program does not match the text-converted voice stream comprising the name of the file the user desires to be opened and a name of a file located in the currently open folder in the file storage directory, by the listing program,
    (A) sending an audible request comprising instructions that the file does not exist in the currently open folder in the file storage directory, to the user through the audio output device of the hand-held mobile self-powered wireless device, and
    (B) looping back to step (i) of this subroutine, when a command extracted from a voice stream is indicative of a user's desire to: (5) create a folder to be located in a currently open folder in the file storage directory of the hand-held mobile self-powered wireless device, by the listing program, initiating a "create folder" subroutine comprising the steps of:
  (i) by the listing program, sending an audible request comprising instructions for the user to say a voice stream comprising the name of the folder the user desires to be created, to the user through the audio output device of the hand-held mobile self-powered wireless device,
  (ii) by the user of the hand-held mobile self-powered wireless device, saying the voice stream comprising the name of the folder the user desires to be created,
  (iii) by the human input device of the hand-held mobile self-powered wireless device, obtaining the voice stream comprising the name of the folder the user desires to be created,
  (iv) by the listing program, performing a speech-to-text conversion on the voice stream comprising the name of the folder the user desires to be created,
  (v) by the listing program, comparing the text-converted voice stream comprising the name of the folder the user desires to be created to names of folders located in the currently open folder in the file storage directory, (vi) in the event that the listing program matches the text-converted voice stream comprising the name of the folder the user desires to be created and a name of a folder located in the currently open folder of the file storage directory, by the listing program, (A) sending an audible comprising instructions that the folder name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the folder the user desires to be created and a name of a folder located in the currently open folder in the file storage directory, by the listing program, creating a folder with the text-converted voice stream comprising the name of the folder the user desires to be created in the currently open folder of the file storage directory, when a command extracted from a voice stream is indicative of a user's desire to: (6) create a file to be located in a currently open folder in the file storage directory of the hand-held mobile self-powered wireless device, by the listing program, initiating a "create file" subroutine comprising the steps of:

(i) by the listing program, sending an audible request comprising instructions for the user to say a voice stream comprising the name of the file the user desires to be created, to the user through the audio output device of the hand-held mobile self-powered wireless device, (ii) by the user of the hand-held mobile self-powered wireless device, saying the voice stream comprising the name of the file the user desires to be created, (iii) by the human input device of the hand-held mobile self-powered wireless device, obtaining the voice stream comprising the name of the file the user desires to be created, (iv) by the listing program, performing a speech-to-text conversion on the voice stream comprising the name of the file the user desires to be created, (v) by the listing program, comparing the text-converted voice stream comprising the name of the file the user desires to be created to names of files located in the currently open folder in the folder in the file storage directory, (vi) in the event that the listing program matches the text-converted voice stream comprising the name of the file the user desires to be created and a name of a file located in the currently open folder in the file storage directory, by the listing program, (A) sending an audible request comprising instructions that the file name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the file the user desires to be created and a name of a file in the currently open folder located in the file storage directory, by the listing program, creating a file with the text-converted voice stream comprising the name of the file the user desires to be created in the currently open folder of the file storage directory, when a command extracted from a voice stream is indicative of a user's desire to: (7) delete a folder located in a currently open folder in the file storage directory of the hand-held mobile self-powered wireless device, by the listing program, initiating a "delete folder" subroutine comprising the steps of:

(i) by the listing program, sending an audible request comprising instructions for the user to say a voice stream comprising the name of the folder the user desires to be deleted, to the user through the audio output device of the hand-held mobile self-powered wireless device, (ii) by the user of the hand-held mobile self-powered wireless device, saying the voice stream comprising the name of the folder the user desires to be deleted, (iii) by the human input device of the hand-held mobile self-powered wireless device, obtaining the voice stream comprising the name of the folder the user desires to be deleted, (iv) by the listing program, performing a speech-to-text conversion on the voice stream comprising the name of the folder the user desires to be deleted, (v) by the listing program, comparing the text-converted voice stream comprising the name of the folder the user desires to be deleted to names of folders located in the currently open folder in the file storage directory, (vi) in the event that the listing program matches the text-converted voice stream comprising the name of the folder the user desires to be deleted and a name of a folder located in the currently open folder in the folder storage directory, by the listing program, deleting the matching folder in the currently open folder in the file storage directory, and (vii) in the event that the listing program does not match the text-converted voice stream comprising the name of the folder the user desires to be deleted and a name of a folder in the currently open folder located in the file storage directory, by the listing program, (A) sending an audible request comprising instructions that the folder name does not exist in the currently open folder located in file storage directory, to the user through the audio output device of the hand-held mobile self-powered wireless device, and (B) looping back to step (i) of this subroutine, when a command extracted from a voice stream is indicative of a user's desire to: (8) delete a file located in a currently open folder in the file storage directory of the hand-held mobile self-powered wireless device, by the listing program, initiating a "delete file" subroutine comprising the steps of:

(i) by the listing program, sending an audible request comprising instructions for the user to say a voice stream comprising the name of the file the user desires to be deleted, to the user through the audio output device of the hand-held mobile self-powered wireless device, (ii) by the user of the hand-held mobile self-powered wireless device, saying the voice stream comprising the name of the file the user desires to be deleted, (iii) by the human input device of the hand-held mobile self-powered wireless device, obtaining the voice stream comprising the name of the file the user desires to be deleted, (iv) by the listing program, performing a speech-to-text conversion on the voice stream comprising the name of the file the user desires to be deleted, (v) by the listing program, comparing the text-converted voice stream comprising the name of the file the user desires to be deleted to names of files located in the currently open folder in the file storage directory, (vi) in the event that the listing program matches the text-converted voice stream comprising the name of the file the user desires to be deleted and a name of a file located in the currently open folder in the file storage directory, by the listing program, deleting the matching file in the currently open folder in the file storage directory, and (vii) in the event that the listing program does not match the text-converted voice stream comprising the name of the file the user desires to be deleted and a name of a file in the currently open folder located in the file storage directory, by the listing program, (A) sending an audible request comprising instructions that the file name does not exist in the currently open folder located in file storage directory, to the user through the audio output device of the hand-held mobile self-powered wireless device, and (B) looping back to step (i) of this subroutine, when a command extracted from a voice stream is indicative of a user's desire to: (9) review and manage folders and files located in a currently open folder in the file storage directory of the hand-held mobile self-powered wireless device, by the listing program, initiating a "review folder" subroutine comprising the steps of:

(i) by the listing program, performing a text-to-voice conversion on the names of the names of the folders and files located in the currently open folder in the file storage directory, (ii) by the listing program, sequentially announcing, to a user, the voice conversions of the names of the folders and files located in the currently open folder in the file storage directory through the audio output device of the hand-held mobile self-powered wireless device, (iii) in the event that the user of the hand-held mobile self-powered wireless device desires to delete a file or folder announced during step (ii) of this subroutine, by the user, saying a voice stream comprising a command indicative of the user's desire to delete the file or folder that had been announced immediately prior, by the human input device of the hand-held mobile self-powered wireless device, obtaining the voice stream comprising the command indicative of the user's desire to delete the file or folder that had been announced immediately prior, and by the listing program of the hand-held mobile self-powered wireless device, (A) extracting the command from the voice stream indicative of the user's desire to delete the file or folder that had been announced immediately prior, and (B) deleting the file or folder in the file storage directory in response to the command extracted from the user's voice stream, and (iv) in the event that the user of the hand-held mobile self-powered wireless device desires to open a file or folder announced during step (ii) of this subroutine, by the user, saying a voice stream comprising a command indicative of the user's desire to open the file or folder that had been announced immediately prior, by the human input device of the hand-held mobile self-powered wireless device, obtaining the voice stream comprising the command indicative of the user's desire to open the file or folder that had been announced immediately prior, and by the listing program of the hand-held mobile self-powered wireless device, (A) extracting the command from the voice stream indicative of the user's desire to open the file or folder that had been announced immediately prior, and (B) opening the file or folder in the file storage directory in response to the command extracted from the user's voice stream, when a command extracted from a voice stream is indicative of a user's desire to: (10) review and manage voice streams saved in a currently open file located in the file storage directory of the hand-held mobile self-powered wireless device, by the listing program, initiating a "review voice streams" subroutine comprising the steps of:

(i) by the listing program, sequentially announcing, to the user, the voice stream files located in the currently open file in the file storage directory through the audio output device of the hand-held mobile self-powered wireless device, and (ii) in the event that the user of the hand-held mobile self-powered wireless device desires to delete a voice stream announced during step (i) of this subroutine, by the user, saying a voice stream comprising a command indicative of the user's desire to delete the voice stream that had been announced immediately prior, by the human input device of the hand-held mobile self-powered wireless device, obtaining the voice stream comprising the command indicative of the user's desire to delete the voice stream that had been announced immediately prior, and by the listing program of the hand-held mobile self-powered wireless device, (A) extracting the command from the voice stream indicative of the user's desire to delete the voice stream that had been announced immediately prior, and (B) deleting the voice stream from the file located in the file storage directory in response to the command extracted from the user's voice stream, when a command extracted from a voice stream is indicative of a user's desire to: (11) save a voice stream in a currently open file located in the file storage directory of the hand-held mobile self-powered wireless device, by the listing program, initiating a "save voice stream" subroutine comprising the steps of:

(i) by the listing program, sending an audible request comprising instructions for the user to say a desired voice stream to be recorded in the currently open file in the file storage directory, to the user through the audio output device of the hand-held mobile self-powered wireless device, (ii) by the user of the hand-held mobile self-powered wireless device, saying the desired voice stream to be recorded in the currently open file in the file storage directory, (iii) by the human input device of the hand-held mobile self-powered wireless device, obtaining the voice stream comprising the desired voice stream to be recorded in the currently open file in the file storage directory, and (iv) by the listing program, saving the voice stream as a sound file in the currently open file in the file storage directory, and when a command extracted from a voice stream is indicative of a user's desire to: (12) delete all voice streams located in a currently open file located in the file storage directory of the hand-held mobile self-powered wireless device, by the listing program, initiating a "delete all voice streams" subroutine comprising the steps of:

(i) deleting all voice streams located in the currently open file in the file storage directory.

2. The method of claim 1, wherein the human input device is a microphone.

3. The method of claim 1, wherein the audio output device is a speaker.

4. The method of claim 1, wherein the hand-held mobile self-powered wireless device is a PDA or a cell phone.

5. The method of claim 1, wherein a file located in the file storage directory of the hand-held mobile self-powered wireless device is a reminder list comprising a voice stream detailing an item on the list.

6. The method of claim 5, wherein the reminder list is selected from the group consisting of: a shopping list, a wish list, and a to-do list.

7. The method of claim 1, wherein the method further comprises the steps:

by the listing program of the hand-held mobile self-powered wireless device, extracting commands from voice streams said by the user, wherein the commands extracted from the voice streams comprise commands that are indicative of a user's desires to: (13) stop the listing program; (14) cancel the current subroutine; and (15) list the commands that the listing program recognizes.

when a command extracted from a voice stream is indicative of a user's desire to: (13) stop the listing program, by the listing program, initiating a "stop program" subroutine comprising the steps of:

(i) by the listing program, stopping the program, when a command extracted from a voice stream is indicative of a user's desire to: (14) cancel the current subroutine, by the listing program, initiating a "cancel" subroutine comprising the steps of:

(i) by the listing program, canceling the currently running subroutine, and (ii) sending an audible request comprising instructions for the user that the currently running subroutine has been canceled and for the user to say a voice stream comprising a command, when a command extracted from a voice stream is indicative of a user's desire to: (15) list the commands that the listing program recognizes, by the listing program, initiating a "list commands" subroutine comprising the steps of:

(i) by the listing program, listing the commands that the listing program recognizes.

8. The method of claim 1, wherein the hand-held mobile self-powered wireless device is communicatively coupled to a wide-area wireless communications network enabled with file sharing, wherein the method further comprises:

sending a file located in the file directory over the wide-area wireless communications network, to a second hand-held mobile self-powered wireless device that is coupled to the wide-area wireless communications network.

9. The method of claim 1, wherein the listing program further comprises a "self shutdown" subroutine initiated when a user fails to say a voice stream comprising a command for a period of time greater than 10 seconds, wherein the "self shutdown" subroutine comprises the steps of:

(i) by the listing program, stopping the program.

10. The method of claim 1, wherein the hand-held mobile self-powered wireless device is communicatively coupled to a personal computer, wherein the method further comprises the steps of:

by the user, creating a file, a folder, or both a file and a folder on the personal computer, by the user, transferring the file, the folder, or both the file and the folder to the file storage directory of the hand-held mobile self-powered wireless device.

11. The method of claim 1, wherein step (ii) of each of the "open folder", "open file", "create folder", "create file", "delete folder", and "delete file" subroutines, is accomplished by the user saying the name of the file or folder by spelling the name of the file or folder.

12. A hand-held mobile self-powered wireless device comprising: a listing program comprising a speech recognition engine, a text-to-speech engine, and a plurality of subroutines that are initiated in response to commands extracted by the listing program from a user's voice streams; a memory having a file storage directory comprising a hierarchy of folders, files stored within the hierarchy of folders, and voice streams stored within files stored within the hierarchy of folders; a human input device; an audio output device; and a microprocessor, wherein each of the listing program, the memory, the human input device, and the audio output device are coupled through the microprocessor, the hand-held mobile self-powered wireless device further comprising:

means for initiating the listing program of the hand-held mobile self-powered wireless device, means for obtaining a voice stream said by user comprising a command, means for extracting commands from voice streams said by the user, wherein the commands extracted from the voice streams comprise commands that are indicative of a user's desires to: (1) open a main folder located in the file storage directory of the hand-held mobile self-powered wireless device; (2) open a parent folder of a currently open folder or file located in the file storage directory of the hand-held mobile self-powered wireless device; (3) open a folder located in a currently open folder in the file storage directory of the hand-held mobile self-powered wireless device; (4) open a file located in a currently open folder in the file storage directory of the hand-held mobile self-powered wireless device; (5) create a folder to be located in a currently open folder in the file storage directory of the hand-held mobile self-powered wireless device; (6) create a file to be located in a currently open folder in the file storage directory of the hand-held mobile self-powered wireless device; (7) delete a folder located in a currently open folder in the file storage directory of the hand-held mobile self-powered wireless device; (8) delete a file located in a currently open folder in the file storage directory of the hand-held mobile self-powered wireless device; (9) review and manage folders and files located in a currently open folder in the file storage directory of the hand-held mobile self-powered wireless device; (10) review and manage voice streams saved in a currently open file located in the file storage directory of the hand-held mobile self-powered wireless device; (11) save a voice stream in a currently open file located in the file storage directory of the hand-held mobile self-powered wireless device; and (12) delete all voice streams located in a currently open file located in the file storage directory of the hand-held mobile self-powered wireless device;

when a command extracted from a voice stream is indicative of a user's desire to: (1) open the main folder located in the file storage directory of the hand-held mobile self-powered wireless device, means for initiating an "open main folder" subroutine comprising means for:
  (i) opening the main folder located in the file storage directory, when a command extracted from a voice stream is indicative of a user's desire to: (2) open the parent folder of the currently open folder or file located in the file storage directory of the hand-held mobile self-powered wireless device, means for initiating an "open parent folder" subroutine comprising means for:
  (i) opening the parent folder of the currently open folder or file located in the file storage directory, when a command extracted from a voice stream is indicative of a user's desire to: (3) open a folder located in a currently open folder in the file storage directory of the hand-held mobile self-powered wireless device, means for initiating an "open folder" subroutine comprising means for:
  (i) sending an audible request comprising instructions for the user to say a voice stream comprising the name of the folder the user desires to be opened, to the user through the audio output device of the hand-held mobile self-powered wireless device,
  (ii) obtaining the voice stream comprising the name of the folder the user desires to be opened,
  (iii) performing a speech-to-text conversion on the voice stream comprising the name of the folder the user desires to be opened,
  (iv) comparing the text-converted voice stream comprising the name of the folder the user desires to be opened to the names of folders located in a currently open folder in the file storage directory,
  (v) in the event that the listing program matches the text-converted voice stream comprising the name of the folder the user desires to be opened and a name of a folder located in the currently open folder in the file storage directory, means for opening the matching folder located in a currently open folder in the file storage directory, and
  (vi) in the event that the listing program does not match the text-converted voice stream comprising the name of the folder the user desires to be opened and a name of a folder located in the currently open folder in the file storage directory, means for
    (A) sending an audible request comprising instructions for the user that the folder does not exist in the currently open folder in the file storage directory, to the user through the audio output device of the hand-held mobile self-powered wireless device, and
    (B) looping back to step (i) of this subroutine, when a command extracted from a voice stream is indicative of a user's desire to: (4) open a file located in a currently open folder in the file storage directory of the hand-held mobile self-powered wireless device, means for initiating an "open file" subroutine comprising means for:
  (i) sending an audible request comprising instructions for the user to say a voice stream comprising the name of the file the user desires to be opened, to the user through the audio output device of the hand-held mobile self-powered wireless device,
  (ii) obtaining the voice stream comprising the name of the file the user desires to be opened,
  (iii) performing a speech-to-text conversion on the voice stream comprising the name of the file the user desires to be opened,
  (iv) comparing the text-converted voice stream comprising the name of the file the user desires to be opened to names of files located in the currently open folder in the file storage directory,
  (v) in the event that the listing program matches the text-converted voice stream comprising the name of the file the user desires to be opened and a name of a file located in the currently open folder in the file storage directory, means for opening the matching file located in the currently open folder in the file storage directory, and
  (vi) in the event that the listing program does not match the text-converted voice stream comprising the name of the file the user desires to be opened and a name of a file located in the currently open folder in the file storage directory, means for
    (A) sending an audible request comprising instructions that the file does not exist in the currently open folder in the file storage directory, to the user through the audio output device of the hand-held mobile self-powered wireless device, and
    (B) looping back to step (i) of this subroutine, when a command extracted from a voice stream is indicative of a user's desire to: (5) create a folder to be located in a currently open folder in the file storage directory of the hand-held mobile self-powered wireless device, means for initiating a "create folder" subroutine comprising means for:
  (i) means for sending an audible request comprising instructions for the user to say a voice stream comprising the name of the folder the user desires to be created, to the user through the audio output device of the hand-held mobile self-powered wireless device,
  (ii) means for obtaining the voice stream comprising the name of the folder the user desires to be created,
  (iii) means for performing a speech-to-text conversion on the voice stream comprising the name of the folder the user desires to be created,
  (iv) means for comparing the text-converted voice stream comprising the name of the folder the user desires to be created to names of folders located in the currently open folder in the file storage directory,
  (v) in the event that the listing program matches the text-converted voice stream comprising the name of the folder the user desires to be created and a name of a folder located in the currently open folder of the file storage directory, means for
    (A) sending an audible comprising instructions that the folder name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the folder the user desires to be created and a name of a folder located in the currently open folder in the file storage directory, means for creating a folder with the text-converted voice stream comprising the name of the folder the user desires to be created in the currently open folder of the file storage directory, when a command extracted from a voice stream is indicative of a user's desire to: (6) create a file to be located in a currently open folder in the file storage directory of the hand-held mobile self-powered wireless device, means for initiating a "create file" subroutine comprising means for:

(i) sending an audible request comprising instructions for the user to say a voice stream comprising the name of the file the user desires to be created, to the user through the audio output device of the hand-held mobile self-powered wireless device, (ii) obtaining the voice stream comprising the name of the file the user desires to be created, (iii) performing a speech-to-text conversion on the voice stream comprising the name of the file the user desires to be created, (iv) comparing the text-converted voice stream comprising the name of the file the user desires to be created to names of files located in the currently open folder in the folder in the file storage directory, (v) in the event that the listing program matches the text-converted voice stream comprising the name of the file the user desires to be created and a name of a file located in the currently open folder in the file storage directory, means for (A) sending an audible request comprising instructions that the file name already exists in the currently open folder located in file storage directory, to the user through the audio output device of the hand-held mobile self-powered wireless device, and (B) looping back to step (i) of this subroutine, and (vii) in the event that the listing program does not match the text-converted voice stream comprising the name of the file the user desires to be created and a name of a file in the currently open folder located in the file storage directory, means for creating a file with the text-converted voice stream comprising the name of the file the user desires to be created in the currently open folder of the file storage directory, when a command extracted from a voice stream is indicative of a user's desire to: (7) delete a folder located in a currently open folder in the file storage directory of the hand-held mobile self-powered wireless device, means for initiating a "delete folder" subroutine comprising means for:

(i) sending an audible request comprising instructions for the user to say a voice stream comprising the name of the folder the user desires to be deleted, to the user through the audio output device of the hand-held mobile self-powered wireless device, (ii) obtaining the voice stream comprising the name of the folder the user desires to be deleted, (iii) performing a speech-to-text conversion on the voice stream comprising the name of the folder the user desires to be deleted, (iv) comparing the text-converted voice stream comprising the name of the folder the user desires to be deleted to names of folders located in the currently open folder in the file storage directory, (vi) in the event that the listing program matches the text-converted voice stream comprising the name of the folder the user desires to be deleted and a name of a folder located in the currently open folder in the folder storage directory, means for deleting the matching folder in the currently open folder in the file storage directory, and (vii) in the event that the listing program does not match the text-converted voice stream comprising the name of the folder the user desires to be deleted and a name of a folder in the currently open folder located in the file storage directory, means for (A) sending an audible request comprising instructions that the folder name does not exist in the currently open folder located in file storage directory, to the user through the audio output device of the hand-held mobile self-powered wireless device, and (B) looping back to step (i) of this subroutine, when a command extracted from a voice stream is indicative of a user's desire to: (8) delete a file located in a currently open folder in the file storage directory of the hand-held mobile self-powered wireless device, means for initiating a "delete file" subroutine comprising means for:

(i) sending an audible request comprising instructions for the user to say a voice stream comprising the name of the file the user desires to be deleted, to the user through the audio output device of the hand-held mobile self-powered wireless device, (ii) obtaining the voice stream comprising the name of the file the user desires to be deleted, (iii) performing a speech-to-text conversion on the voice stream comprising the name of the file the user desires to be deleted, (iv) comparing the text-converted voice stream comprising the name of the file the user desires to be deleted to names of files located in the currently open folder in the file storage directory, (v) in the event that the listing program matches the text-converted voice stream comprising the name of the file the user desires to be deleted and a name of a file located in the currently open folder in the file storage directory, means for deleting the matching file in the currently open folder in the file storage directory, and (vi) in the event that the listing program does not match the text-converted voice stream comprising the name of the file the user desires to be deleted and a name of a file in the currently open folder located in the file storage directory, means for (A) sending an audible request comprising instructions that the file name does not exist in the currently open folder located in file storage directory, to the user through the audio output device of the hand-held mobile self-powered wireless device, and (B) looping back to step (i) of this subroutine, when a command extracted from a voice stream is indicative of a user's desire to: (9) review and manage folders and files located in a currently open folder in the file storage directory of the hand-held mobile self-powered wireless device, means for initiating a "review folder" subroutine comprising means for:

(i) performing a text-to-voice conversion on the names of the names of the folders and files located in the currently open folder in the file storage directory, (ii) sequentially announcing, to a user, the voice conversions of the names of the folders and files located in the currently open folder in the file storage directory through the audio output device of the hand-held mobile self-powered wireless device, (iii) in the event that the user of the hand-held mobile self-powered wireless device desires to delete a file or folder announced during step (ii) of this subroutine, means for obtaining a voice stream comprising a command indicative of the user's desire to delete the file or folder that had been announced immediately prior, and means for
(A) extracting the command from the voice stream indicative of the user's desire to delete the file or folder that had been announced immediately prior, and
(B) deleting the file or folder in the file storage directory in response to the command extracted from the user's voice stream, and (iv) in the event that the user of the hand-held mobile self-powered wireless device desires to open a file or folder announced during step (ii) of this subroutine, means for obtaining a voice stream comprising a command indicative of the user's desire to open the file or folder that had been announced immediately prior, and means for
(A) extracting the command from the voice stream indicative of the user's desire to open the file or folder that had been announced immediately prior, and
(B) opening the file or folder in the file storage directory in response to the command extracted from the user's voice stream, when a command extracted from a voice stream is indicative of a user's desire to: (10) review and manage voice streams saved in a currently open file located in the file storage directory of the hand-held mobile self-powered wireless device, means for initiating a "review voice streams" subroutine comprising means for:

(i) sequentially announcing, to the user, the voice stream files located in the currently open file in the file storage directory through the audio output device of the hand-held mobile self-powered wireless device, and (ii) in the event that the user of the hand-held mobile self-powered wireless device desires to delete a voice stream announced during step (i) of this subroutine, means for obtaining a voice stream comprising a command indicative of the user's desire to delete the voice stream that had been announced immediately prior, and means for
(A) extracting the command from the voice stream indicative of the user's desire to delete the voice stream that had been announced immediately prior, and
(B) deleting the voice stream from the file located in the file storage directory in response to the command extracted from the user's voice stream, when a command extracted from a voice stream is indicative of a user's desire to: (11) save a voice stream in a currently open file located in the file storage directory of the hand-held mobile self-powered wireless device, means for initiating a "save voice stream" subroutine comprising means for:

(i) sending an audible request comprising instructions for the user to say a desired voice stream to be recorded in the currently open file in the file storage directory, to the user through the audio output device of the hand-held mobile self-powered wireless device, (iii) obtaining a voice stream comprising a desired voice stream to be recorded in the currently open file in the file storage directory, and (iv) saving the voice stream as a sound file in the currently open file in the file storage directory, and when a command extracted from a voice stream is indicative of a user's desire to: (12) delete all voice streams located in a currently open file located in the file storage directory of the hand-held mobile self-powered wireless device, means for initiating a "delete all voice streams" subroutine comprising means for:

(i) deleting all voice streams located in the currently open file in the file storage directory.

13. The hand-held mobile self-powered wireless device of claim 12, wherein the means for obtaining a voice stream is a human input device.

14. The hand-held mobile self-powered wireless device of claim 13, wherein the human input device is a microphone.

15. The hand-held mobile self-powered wireless device of claim 12, wherein the audio output device is a speaker.

16. The hand-held mobile self-powered wireless device of claim 12, wherein the hand-held mobile self-powered wireless device is a PDA or a cell phone.

17. The hand-held mobile self-powered wireless device of claim 12, wherein a file located in the file storage directory of the hand-held mobile self-powered wireless device is a reminder list comprising a voice stream detailing an item on the list.

18. The hand-held mobile self-powered wireless device of claim 17, wherein the reminder list is selected from the group consisting of: a shopping list, a wish list, and a to-do list.

19. The hand-held mobile self-powered wireless device of claim 12, wherein the hand-held mobile self-powered wireless device of claim further comprises means for:

extracting commands from voice streams said by the user, wherein the commands extracted from the voice streams comprise commands that are indicative of a user's desires to: (13) stop the listing program; (14) cancel the current subroutine; and (15) list the commands that the listing program recognizes.

when a command extracted from a voice stream is indicative of a user's desire to: (13) stop the listing program, means for initiating a "stop program" subroutine comprising means for:

(i) stopping the program, when a command extracted from a voice stream is indicative of a user's desire to: (14) cancel the current subroutine, means for initiating a "cancel" subroutine comprising means for:

(i) canceling the currently running subroutine, and (ii) sending an audible request comprising instructions for the user that the currently running subroutine has been canceled and for the user to say a voice stream comprising a command, when a command extracted from a voice stream is indicative of a user's desire to: (15) list the commands that the listing program recognizes, means for initiating a "list commands" subroutine comprising means for:

(i) listing the commands that the listing program recognizes.

20. The hand-held mobile self-powered wireless device of claim 12, wherein the hand-held mobile self-powered wireless device is communicatively coupled to a wide-area wireless communications network enabled with file sharing, wherein the hand-held mobile self-powered wireless device further comprises means for:

sending a file located in the file storage directory over the wide-area wireless communications network, to a second hand-held mobile self-powered wireless device that is coupled to the wide-area wireless communications network further comprising means for sending a file or files located in the file directory over the wide-area wireless communications network to a second hand-held mobile self-powered wireless device.

21. The hand-held mobile self-powered wireless device of claim 12, wherein the listing program further comprises a "self shutdown" subroutine initiated when a user fails to say a voice stream comprising a command for a period of time greater than 10 seconds, wherein the "self shutdown" subroutine comprises means for:

(i) stopping the program.

* * * * *